June 17, 1969   A. B. AMIDON ET AL   3,450,530
PHOTOGRAPHIC IMAGING BY MEANS OF THE SURFACE
TENSION CREATED BY PHOTOCHROMIC MATERIALS
Filed Sept. 3, 1965

INVENTORS.
CARL BRYNKO
ALAN B. AMIDON
BY Ronald Zibelli
James J. Ralabate
ATTORNEYS

United States Patent Office 3,450,530
Patented June 17, 1969

3,450,530
PHOTOGRAPHIC IMAGING BY MEANS OF THE SURFACE TENSION CREATED BY PHOTOCHROMIC MATERIALS
Alan B. Amidon, Penfield, and Carl Brynko, West Webster, N.Y., assignors to Xerox Corporation, Rochester, N.Y., a corporation of New York
Filed Sept. 3, 1965, Ser. No. 484,794
Int. Cl. G03c 5/04, 1/66
U.S. Cl. 96—27         12 Claims

ABSTRACT OF THE DISCLOSURE

A photographic image is formed by providing an imaging-layer containing a photochromic material, forming a uniform, fine, light scattering surface pattern on the imaging layer exposing the imaging layer to actinic electromagnetic radiation in image configuration to convert a portion of the photochromic material from one photochromic state to another, and softening the imaging layer until the surface deformation pattern is smoothed out by surface tension in imagewise configuration according to the difference in surface tension between exposed and unexposed areas.

---

This invention relates in general to a novel imaging system and, more specifically, to an imaging system employing light induced changes in the surface tension properties of organic photochromic compounds.

Materials which undergo reversible photo-induced color change are referred to as photochromic. In the absence of actinic radiation these materials have a relatively stable configuration with a characteristic absorption spectrum. However, when a photochromic material is exposed to actinic radiation such as ultraviolet light, the absorption spectrum changes drastically so that the appearance of the material changes from colorless to red, red to green or the like. These property changes are believed to occur because of changes in the molecular or electronic configuration of the material from a lower to a higher energy state. These changes occur because the photochromic materials generally have very efficient routes for the internal conversion of absorbed excited state electronic energy into vibrational and torsional twisting modes of the molecule upon exposure to light. This conversion may, for example, result in the isomerization of the molecule. The conversion of each molecule normally takes place at an extremely rapid speed, but actual observation of a change in color in conventional systems takes longer because of the relatively low concentration produced per unit time and the depletion of the excited, colored form by the competing but slower reconversion to the lower unexcited form. Accordingly, photochromic materials of lower conversion efficiency tend to produce pale color changes at best.

Unfortunately, the higher, colored form of the photochromic material exists in an excited, unstable condition which reverts to the lower form with its original absorption band and color after the source of actinic radiation is removed. Since imaging techniques proposed in the prior art employ the color change to make the image, these materials cannot be used in permanent imaging systems. Although an enormous amount of time, money and effort has been expended by many research organizations on attempting to stabilize the higher energy forms of a great many different photochromic compounds so as to make them suitable for use in practical imaging systems, and although some success has been achieved in slowing down the reconversion of the higher to the lower form of some photochromic compounds with various modifications of their substituents, no one has to date yet succeeded in permanently stabilizing these higher forms. Additional effort has been devoted to the problem of achieving maximum color change from the lower to the higher form of various photochromic compounds, but even had these goals been achieved, the problem of deactivating the lower form of photochromic material in background areas would still remain. In essence then, there have been two fixing problems in photochromic imaging involving both the stabilization of the higher colored form in exposed areas and the deactivation of the lower, uncolored form in background areas of the image, and neither of these problems has been effectively solved. Consequently, the phenomenon of photochromism has remained largely a laboratory curiosity rather than an effective and commercially acceptable means of imaging.

It is accordingly an object of this invention to provide a novel imaging system.

It is a further object of the present invention to provide a novel imaging method based on the use of organic photochromic compounds.

Another object of this invention is to provide an imaging system which can effectively employ even those organic photochromic materials which exhibit little or no visible change in color on exposure.

A still further object of the invention is to provide an imaging method and apparatus utilizing organic photochromic compounds in which the image generated by imagewise exposure of the compound serves only as a temporary latent image for the developing and fixing steps which produce the permanent image that in no way depends upon the permanency of the higher energy form of the photochromic compound itself.

Yet another object of this invention is to provide a novel imaging method and apparatus in which photochromic compounds are employed to produce permanent images, by merely exposing them to heat or a solvent vapor.

The above and still further objects of the present invention are accomplished, generally speaking, by providing a system in which a layer of a photochromic compound with a uniformly deformed light scattering surface is exposed to an image with actinic electromagnetic radiation. This exposure source may constitute a source of visible light, ultraviolet light, X-ray or any other radiation source which is capable of converting the photochromic compound from one form to the other. After imagewise conversion of at least a portion of the photochromic layer from one state to the other, the photochromic layer is exposed to heat, solvent vapor or other softening influence and because of the marked differences in surface tension between the two states of the same photochromic compound, a pattern is formed on the photochromic layer when the area of higher surface tension smoothes itself out removing its irregular surface. It should be emphasized here that the exposure must only convert enough photochromic molecules to produce a significant difference between the surface tension of the exposed and unexposed areas. Because the relatively small number of molecules which must be converted to fulfill this requirement with some materials, a visible color change need not necessarily be produced in all instances.

The photochromic layer may be composed solely of one or more photochromic compounds providing that it has the requisite strength and film forming ability and can hold the initial surface scattering pattern. For convenience, however, the photochromic material will generally be dispersed or dissolved in solid solution in a plastic resin. This resin may be thought of as a binder or matrix for the photochromic material, which also serves as a deformable medium which in many instances will facilitate the formation of the initial uniform surface scattering deformation. Any suitable light scattering surface deformation may be employed for initial uniform application over the surface of the imaging layer. These may include deformation patterns caused by electric field forces upon softening of the film known as "frost" or "relief" thermoplastic deformation imaging or "blush" imaging caused by phase separation during solvent coating of the film or can merely be pressed into the material surface with a die. Since many photochromic compounds are relatively expensive, the use of the resin also serves to decrease the overall cost of the imaging layer. In addition, since it has been found that certain resins inherently form every dense thermoplastic deformation, resins of this type may be used to impart increased overall density to the imaging system because of the denser uniform initial scattering surface formed on the imaging surface.

In order that the invention will be more clearly understood, reference is now made to the accompanying drawings in which an embodiment of the invention is illustrated by way of example and in which.

Figure 1:
FIGURE 1 is a side sectional view of an imaging member with a uniform scattering pattern for use in the invention.

Referring now to FIGURE 1, there is seen an imaging member generally designated 11 made up of a photoresponsive layer 12 including light scattering deformations 14 on a supporting substrate 13. A conductive material, such as copper, brass, aluminum, silver, gold, optically transparent layers of tin oxide or copper iodide on glass or the like, may be employed to fabricate layer 13 so that the substrate will provide mechanical strength to the imaging member and will also serve as a conductive ground plane to facilitate electrical charging of the imaging member during the initial formation of uniform scattering pattern 14, as more fully described hereinafter. In the event that a charging technique which does not require a ground plane is employed or in the event that some other deformation technique such as die pressing is used, the conductive substrate layer 13 may be eliminated from the system. One charging technique of this type is two-sided corona charging as described, for example, in U.S. Patent 2,922,883. Imaging layer 12 may, as stated above, consist entirely of a photochromic compound providing the compound is strong enough to have structural integrity either alone or when coated on a substrate.

Any suitable light scattering initial deformation pattern may be employed. The initial deformation 14 may, for example, be of either the type known as "frost" deformation, as described for example in an article entitled "A Cyclic Xerographic Method Based on Frost Deformation" by R. W. Gundlach and C. J. Claus appearing in the January-February 1963 issue of the Journal of Photographic Science and Engineering, and as described in copending U.S. patent application S.N. 193,277, filed May 8, 1962, entitled "Electrostatic Frosting" or it may be a type of deformation known as "relief" as described, for example, in U.S. Patent 3,113,179 to Glenn laid down in a uniform pattern. Another method of forming the initial light scattering deformation pattern on the surface of the imaging layer is to heat it to a viscous or molten condition and press the pattern in with a shaped die of metal or other heat-resistant material much in the way that a phonograph record is pressed. The pattern can also be formed by "blushing" or phase separation.

In the formation of "blush" light scattering patterns uniformly over the surface of the imaging film the light scattering pattern is not created by an electrostatically induced deformation of the softened film but by polymer precipitation at the surface of the resin layer. This process may be considered as a special form of phase separation especially when it is carried out by allowing a resin solution to dry in a high humidity atmosphere. Under these conditions, the evaporation of the solvent at the surface of the coating causes a localized cooling which, in turn, creates a super saturation of water vapor. The excess water vapor is condensed in the form of microscopic water droplets at the resin-air interface. The presence of moisture on and in the resin solution causes the polymer to precipitate in a very localized fashion around each water droplet caused by a localized solution of water in the resin solvent. The resin present in this particular volume, which is occupied by the two solvents, is phase separated and as a result, assumes the surface contour that tends to isolate the solvent mixture which was the original cause of the precipitation of the polymer. In cases where the solvent used in the resin solution boils at a temperature below the boiling point of water, the solvent will tend to evaporate before the water so that in the final stages of drying only water occupies the microscopic crater caused by the phase separation effect, and as the water evaporates, these craters are permanently left in the resin layer. These craters form the light scattering surface of the imaging layer. In this case, of course, a photochromic compound is either mixed with the resin or used in place of the resin so that the imaging process can be carried out as explained more fully hereinafter.

Since most photochromic compounds are relatively expensive as compared with resins which are suitable for use in combination therewith and since some photochromics have low physical strength, low resistivity or other properties which are undesirable for use in an imaging layer, as described above, the photochromic will generally be dissolved in or dispersed in a suitable resin. Reference is made to the aforementioned patent applications and publication as well as to U.S. Patent 3,118,786; 3,055,006; 3,063,872; and 3,113,179 for a number of exemplary insulating resin materials which have been used in electrostatically induced thermoplastic deformation imaging such as "frost" and "relief." Any suitable resin may be used, however. Typical insulating thermoplastic resins include Staybelite Ester 10 and Pentalyn H, pentaerythritol and glycerol esters, respectively, of partially (50%) hydrogenated rosin sold by the Hercules Powder Co. of Wilmington, Del.; Velsicol EL–11, a terpolymer of styrene, indene and isoprene, marketed by the Velsicol Chemical Co. of Chicago, Ill.; polyalpha-methyl styrene; Piccolyte S–70 and S–100 (polyterpene resins made predominantly from beta pinene available from the Pennsylvania Industrial Chemical Co. and having ring and ball melting points of 70° C. and 100° C., respectively); Piccopale 70SF and 85 (non-reactive olefin-diene resins, available from the Pennsylvania Industrial Chemical Co. having melting points of 70° C. and 85° C. and molecular weights of 800 and 1000, respectively); Piccodiene 2212 (a styrene-butadiene resin available from the same company); Piccolastic A–75, D–100 and E–100 (polystyrene resins with melting points of 75° C., 100° C. and 100° C. available from the same company); Neville R–21, R–9 and Nevillac Hard (cumarone-indene resins); Amberol ST137X (an unreactive, unmodified, phenol-formaldehyde resin available from Rohm & Haas); sucrose acetate isobutyrate; Arclor 1242 (a chlorinated polyphenyl); Pliolite AC (a styrene-acrylate copolymer); Pliolite VTAC (a vinyl toluene-acrylate copolymer); and Neolyn 23 (an alkyd resin available from Hercules Powder Co.). Where the initial uniform deformation pattern is formed by one of the non-electrostatic methods, many other less insulating resins may also be used.

As stated above, the percentage of photochromic compound in the imaging coating 12 may range anywhere from 100% by weight of photochromic compound down to about 1% by weight of photochromic with the remainder being a resin of the type described herein. Any suitable photochromic compound may be employed. Typical photochromic compounds include: Spiropyrans such as 1,3,3 - trimethyl-6'-nitro-8'-allylspiro (2'H-1'-benzopyran-2,2'-indoline);
1,3,3-trimethyl-5,6'-dinitro-spiro (2'H-1'-benzopyran-2,2'-indoline);
1,3,3-trimethyl-7'-nitro-spiro (2'H1'-benzopyran-2,2'-indoline);
3-methyl-6-nitro-spiro-[2H-1-benzopyran-2,2'-(2'H-1'-beta-naphthopyran)];
1,3,3-trimethyl-8'-nitro-spiro (2'H-1'-benzopyran-2,2'-indoline);
1,3,3-trimethyl-6'-methoxy-8'-nitro-spiro (2'H-1'-benzopyran-2,2'-indoline);
1,3,3-trimethyl-5-chloro-5'-nitro-8'-methoxy-spiro (2'H-1'-benzopyran-2,2'-indoline);
1,3-dimethyl-3-isopropyl-6'-nitro-spiro (2'H-1'-benzopyran-2,2'-indoline);
1-phenyl-3,3-dimethyl-6'-nitro-8'-methoxy-spiro (2'H-1'-benzopyran-2,2'-indoline);
7'-nitro-spiro-[xantho-10,2' (2'H-1'-benzobetanapthopyran)];
3,3'-dimethyl-6'-nitro-spiro (2'H-1'-benzopyran-2,2'-benzo-thiazole);
3,3'-dimethyl-6'-nitro-spiro (2'H–1'-benzopyran-2,2'-benzo-oxazole);
1,3,3-trimethyl-6'-nitro-spiro (2'H-1'-benzopyran-2,2'-indoline);
6'-nitro-8'-methoxy-1,3,3-trimethylindo-linobenzopyrylospiran;
6'-nitro-1,3,3-trimethylindolinobenzopyrylospiran;
8'-allyl-1,3,3-trimethylindolinobenzopyrylospiran;
8'-carbomethoxy-1,3,3-trimethylindolinobenzopyrylospiran;
8'-methoxy-1,3,3-trimethylindolinobenzopyrylospiran;
6',8'-dinitro-1,3,3-trimethylindolinobenzopyrylospiran;
7'-nitro-1,3,3-trimethylindolinobenzopyrylospiran;
8'-nitro-1,3,3-trimethylindolinobenzopyrylospiran;
6'8'-dibromo-1,3,3-trimethylindolinobenzopyrylospiran;
6'-chloro-8' nitro-1,3,3-trimethylindolinobenzopyrylospiran;
5-nitro-6'-nitro-1,3,3-trimethylindolinobenzopyrylospiran;
6'-nitro-8'-fluoro-1,3,3-trimethylindolinobenzopyrylospiran;
6'-methoxy-8'-nitro-1,3,3-trimethylindolinobenzopyrylospiran;
5'-nitro-8'-methoxy-1,3,3-trimethylindolinobenzopyrylospiran;
6'-bromo-8'-nitro-1,3,3-trimethylindolinobenzopyrylospiran;

Anthrones such as bianthrone;
xanthylideneanthrone;
4,4'-methylanthrone;
4,4'-methoxybianthrone;
3-chloro-10-(9'-xanthylidene)-anthrone;
3-methyl-10-(9'-xanthylidene)-anthrone;
4'-chloro-10-(9'-xanthylidene)-anthrene; and
10'-9'-2'-methyl xanthylidene)-anthrone;

Sydnones such as

N-(3-pyridyl)-sydnone;
N-benzylsydnone;
N-p-methylbenzyl-sydnone;
N-3,4-dimethylbenzydnone;
N-p-chlorobenzylsydnone;
N,N'-ethylene-bissydnone; and
N,N'-tetramethylenebissydnone;
Anils such as salicylidene aniline;
5-bromo salicylidenealpha-naphthylamine;
salicylidene-m-phenylenediamine;
salicylidene-m-phenylenediamine;
salicylidene-m-toluidine;
salicylidene 3,4-xylidene;
salicylidene-p-anisidine;
o-nitrobenzidene-p-aminobiphenyl;
o-nitro-benzidene-m-nitroaniline;
o-nitrobenzidene-p-phenetidine;
salicylidene-p-aminobenzoic acid;
p-hydroxy benzidene-p-bromoaniline;
p-hydroxybenzidene 2,4-xylidene;
2-hydroxy-3-methoxy-benzidene 2,5-xylidine; and
salicylidene-o-chloroaniline;

Hydrazones such as the 2,4-dinitrophenylhydrazone of 5-nitrosalicylaldehyde;
benzaldehyde beta-naphthyl-hydrazone;
benzaldehyde anisylhydrazone;
benzaldehyde-m-chloro-phenylhydrazone;
benzaldehyde-p-bromophenylhydrazone;
cinnamaldehyde phenylhydrazone;
cinnamaldehyde beta-naphthylhydrazone;
cinnamaldehyde m-tolylhydrazone;
cinnamaldehyde p-tolylhydrazone;
cinnamaldehyde 3,4-xylylhydrazone;
p-dimethylamino benzaldehyde beta-naphthylhydrazone;
2-furaldehyde beta-naphthylhydrazone;
1-phenol-1-hexen-3-one-phenylhydrazone;
piperonal anisylhydrazone;
piperonal m-chloro-phenylhydrazone;
piperonal beta-naphthylhydrazone;
piperonal m-tolylhydrazone;
p-tolualdehyde phenylhydrazone;
vanillin beta-naphthylhydrazone;

Osazones such as benzil beta-naphthylosazone;
benzil m-tolylosazone;
benzil 2,4-xylylosazone;
4,4'-dimethoxy benzil beta-naphthylosazone;
4,4'-dimethoxy benzil phenylosazone;
4,4'-dimethoxy benzil-2,4-xylylosazone;
3,4,3',4'-bis (methylene-dioxy) benzil alpha-naphthylosazone;
3,4,3'4', bis (methylene-dioxy) benzil 2,4-xylylosazone;

Semicarbazones such as chalcone semicarbazone;
chalcone phenyl semicarbazone;
2-nitrochalcone semicarbazone;
3-nitrochalcone semicarbazone;
cinnamaldehyde semicarbazone;
cinnamaldehyde thiosemicarbazone;
o-methoxy cinnamaldehyde semicarbazone;
o-methoxy cinnamaldehyde thiosemicarbazone;
o-methoxy cinnamaldehyde phenylsemicarbazone;
1-(4-methoxyphenyl)-5-methyl-1-hexen-3-one-semicarbazone;
1-(1-naphthyl)-1-hexen-3-one-semicarbazone;
1-phenyl-1-penten-3-one semicarbazone;

Stilbene derivatives such as 4,4'-diformamido-2,2'-stilbene disulfonic acid;
4,4'-diacetamido-2,2' stilbene disulfonic acid and its sodium, potassium, barium, strontium, calcium, magnesium and lead salts;
4,4'-bis (4-acetamidobenzoyleneamido)-2,2'-stilbene disulfonic acid;
4,4'-bis(p-(p-acetamidobenzamido)benzamido) 2,2'-stilbene disulfonic acid;

Fulgides (substituted succinic anhydrides) such as alpha-anisyl-gammaphenyl fulgide;
alpha, gamma-dianisyl fulgide, alpha, gamma;
dicumyliso fulgide;
alpha, gamma-diphenyl fulgide;
alpha, gamma-distyryl fulgide;
alpha-piperonyl-gamma-phenyl fulgide;
tetraphenyl fulgide;

Amino-camphor compounds such as 3-(p-dimethyl aminophenylamino)-camphor and
3-(p-diethylaminophenylamino)-camphor;

Thioindigo dyes;

o-Nitrobenzyl derivatives such as 2-(2',4'-dinitrobenzyl) pyridine;
2,4,2'-trinitrodiphenylmethane;
2,4,2',4',2'',4''-hexanitrotriphenylmethane;
ethyl bis (2,4-dinitrophenyl acetate;
2-(2'-nitro-4'-carboxybenzyl pyridine;
3,3'-dinitro-4,4'-bis (2-pyridylmethyl)-azoxybenzene; and
4-(2'-nitro-4'-cyanobenzyl) pyridine.

The spiropyrans are, however, a preferred class of materials owing to their superior and more sensitive imaging capabilities. Whether photoresponsive layer 12 consists of a pure photochromic compound or a blend of a photochromic compound with a resin as described above, it may be coated on the substrate or formed into a self-supporting layer by any convenient technique such as dip coating, extrusion, whirl coating, casting or the like using either a hot melt or a solution of the materials to be coated. Thus, for example, a blend of a photochromic compound and resin may be coated from solution in toluene, xylene, acetone, methyl ethyl ketone, hexane, methanol or any other suitable solvent. In fact, solvent coating or casting is a particularly desirable way to form the photoresponsive layer especially if the initial uniform deformation pattern is frost, reilef or blush. Materials which have not fully cooled from the hot melt condition may also be desirable for this purpose where uniform pre-imaging deformation by frost or relief is to take place just subsequent to layer formation.

Figure 2:
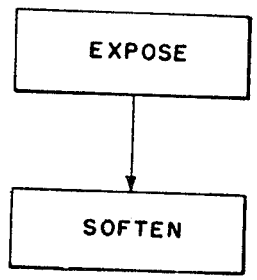
FIGURE 2 is a flow diagram of the process steps of the invention.

As shown in FIGURE 2, the steps involved in carrying out the process involve exposing the photoresponsive layer 12 with its initial uniform surface deformation to an imagewise pattern of actinic electromagnetic radiation and applying a softening influence thereto. This softening influence may consist, for example, of the application of heat or a solvent vapor to the deformed surface of the imaging member. The exposure converts at least a portion of the photochromic from one photochromic state to the other in the exposed areas of the imaging film and, apparently, the attractive or cohesive forces between the molecules in one photochromic state are significantly greater than those between the photochromic compound in the other photochromic state, resulting in a marked difference in surface tension of the two compounds. The resulting surface tension may be higher in the exposed areas or in the unexposed areas, depending upon the particular photochromic material employed. Depending upon whether exposed or unexposed areas have a higher surface tension, either the exposed or unexposed areas of the film will selectively retain their original light scattering deformation pattern whereas the surface of the remaining areas of the film will smooth out. Thus, the light scattering ability of these areas of the film is eliminated resulting in either a positive or negative print of the exposed image. As soon as the scattering pattern is seen to disappear in an imagewise configuration, the softening influence may be removed from the film surface so that the final image is frozen thereon. In this way, a final image is produced made up of a light scattering surface pattern only in exposed or unexposed areas. Extremely high resolution can be produced with this technique, even exceeding that of the original uniform deformation pattern on the imaging layer since very precise erasure of this pattern can be achieved by the technique of the invention. In fact, microscopic examination has indicated that solvent erasure, which is preferred to heat erasure for extremely high resolution imaging, is capable of erasing half of a ripple in a uniform frost deformation pattern. The image may be erased at any time simply by resoftening it and maintaining it at a low viscosity for a sufficient period of time. Surface tension forces will then restore a smooth surface to the film so that it is ready for reuse in the system as desired, assuming the photochromic has reverted to its original state.

In exposing to the image to be reproduced, any source of electromagnetic radiation which is actinic to the photochromic material may be employed. In the case of most photochromic compounds in their lower or unexcited forms, an ultraviolet radiation source may be conveniently employed to expose the material in imagewise configuration so as to convert exposed areas to the higher or excited form of the material, although light of this short wavelength is not always required. Since many photochromic materials in their higher or excited forms may be "triggered" or caused to revert to the lower unexcited form by exposure to visible light, a light source in the visible range (from about 4000–7500 angstrom units) may be conveniently employed for imagewise exposure of a photochromic film which had initially been uniformly converted to the higher or excited form. This type of exposure will then convert exposed areas to the unexcited or lower form of the photochromic material while the background or unexposed areas remain in the excited form. Providing that the image is developed (by softening) before the background areas of the photochromic material revert to the lower, unexcited form by spontaneous relaxation, this technique may be conveniently employed for reversal imaging using the same photochromic. The intensity of the exposure need not necessarily be strong enough to produce an intense color change in the photochromic compound since with most materials, this requires a conversion of a gross amount of the photochromic from one form to the other, while to be operative in the process of this invention, only enough photochromic material must be converted so that a differential pattern of surface tension is formed on imaging layer 12. The term "photochromic," as it is used throughout the specification and claims, should be understood in this context.

Figure 3:
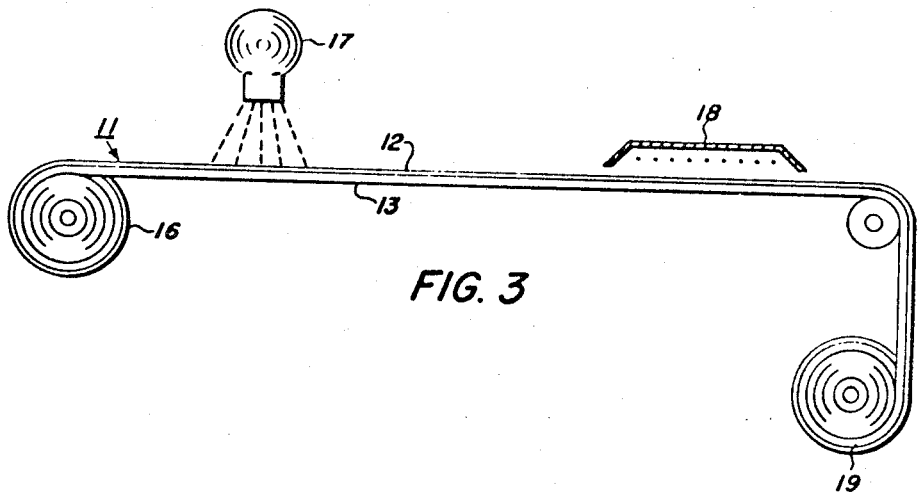
FIGURE 3 is a side sectional view of an illustrative embodiment of an apparatus adapted for imaging according to the invention.

In FIGURE 3, there is illustrated a simple exemplary apparatus for carrying out the imaging technique of this invention. In this figure, there is shown a web of uniformly deformed light scattering imaging material of the same type as the imaging member 11 in FIGURE 1 and, accordingly, the web has been numbered in accordance with the designations on FIGURE 1. Web 11 comes off a supply roll 16 and first passes under a projector 17 which exposes it to the image to be reproduced with an actinic light source. Any suitable projector may be employed for this purpose and may either be of the type which flashes a full frame exposure on the web or may be a scanning projector which scans the image to be reproduced in synchronism with the movement of the imaging web itself. Where longer exposures are required, the web may be stopped and held in position for exposure prior to moving on to the other imaging station. Following exposure web 11 then passes beneath a radiant heater 18 which softens layer 12 of the web so that the differential pattern of surface tension formed by the exposure will cause erasure of non-image areas of the pre-deformed surface of the web. After passing heater 18, the web cools so as to completely freeze the erased pattern in imagewise configuration on the pre-deformed web and then the web is wound on a takeup reel 19.

The following illustrative examples of preferred embodiments of the invention are now given to enable those skilled in the art to more clearly understand and practice the invention described above. Unless otherwise indicated, all parts and percentages are taken by weight.

Example I

Two grams of 6'-nitro-1,3,3-trimethylindolinobenzopyrylospiran and 4 grams of Staybelite Ester 10 resin (described above) are dissolved in 94 grams of toluene. This solution is dip coated in the dark to a thickness of about 1 micron on an aluminum plate and air dried. The film is then charged by passing it under a 3-wire corotron held at 8500 volts positive with respect to the aluminum base of the plate. Following charging, the film is heated with a hot air gun, and a uniform fine grain frost deformation pattern appears on its surface. Upon cooling, this uniform thermoplastic deformation pattern is frozen in the film. The frost film is then exposed to an image with a 9-watt fluorescent light available from the Eastern Corporation of Westbury, Long Island under the tradename "Blacklite" using a filter which passes about a 10 angstrom bandwidth centered on 3660 angstroms. After imagewise exposure, a maroon color image is seen to form on the film. Then the film is exposed to xylene vapor by passing a xylene soaked blotter back and forth near the film surface whereupon the frost deformation disappears in the background (unexposed) film areas, reverting to its original smooth condition there while the frost pattern is retained in exposed areas.

Example II

The procedure of Example I is repeated except that heat is used after exposure in place of the solvent vapor treatment with approximately the same results except for a somewhat lower resolution.

Examples III and IV

The procedure of Example I is repeated with the exception that in Example II, 4 grams of the Staybelite Ester resin and ½ gram of the 6'-nitro-1,3,3-trimethylindolinobenzopyrylospiran are used in the coating solution while in Example IV the ratio is 1 gram of resin to 2 grams of the same photochromic spiran compound. Each of these produce about equal results with those produced by Example I.

Examples V–XVI

The procedure of Example I is followed exactly with the exception that the following resins are substituted for the Staybelite Ester resin of Example I in Examples V–XVI, respectively; Piccolyte S–70, Piccolyte S–100, Piccopale 70SF, Piccopale 85, Piccodiene 2212, alpha methylstyrene polymer, Amberol ST137X, Piccolastic D–100, Piccolastic E–100, Neville R–9, Neville R–21, and Nevillac Hard. All produce about the sames results as Example I.

Examples XVII–XXII

In Examples XVII and XVIII the procedure of Example I is repeated except that the photochromic compound employed is 3-N-pyridyl sydnone in Example XVII and phenyl sydnone in Example XVIII.

In Examples XIX–XXII, the following photochromic compounds are employed. In Example XIX, bianthrone is employed; in Example XX, 9-xanthylidene anthrone is employed; in Example XXI, the 2,4-dinitrophenylhydrazone of 5-nitro-salicylaldehyde is employed; and in Example XXII, 3-N-pyridyl salicylaldehyde is employed. In these four examples, the procedure of Example I is followed except that the same filter is employed with a 100 watt light source for a 20 minute exposure. In all instances, the thermoplastic deformation patterns formed are about equal in quality with the one produced by the procedure of Example I except that the last two examples produce reversal (positive to negative) images, apparently because the excited form of these photochromics is more conductive than the unexcited form.

Example XXIII

The procedure of Example I is repeated exactly except that the frosted film is first uniformly exposed to the 3660 angstrom light source until it achieves a deep maroon color. Following this exposure, a transparency to be reproduced is overlaid on the imaging layer and exposed to a source of yellow light for an hour which serves to bleach or reconvert the excited colored form of the photochromic compound back to its unexcited, colorless form in exposed areas. The softening step of Example I is then carried out resulting in a thermoplastic deformation pattern on the film which is a photographic reversal of the copy of Example I.

Examples XXIV–XXX

The procedure of Example I is followed with the exception that Amberol ST–137X resin is substituted for the Staybelite Ester resin of Example I and the following photochromic compounds are used respectively; in Examples XXIV–XXX in place of the spiropyran photochromic compound of Example I: 2,4-dinitrophenylhydrazone; benzil beta-naphthylosazone; 2-nitro-chalcone semicarbazone; alpha, gamma-diphenyl fulgide; 4,4'-diformamido-2,2'-stilbene disulfonic acid; 3-(p-dimethylaminophenylamino)-camphor; and 2-(2',4'-dinitro-benzyl) pyridine. These produce essentially the same results as Example I when a 20 minute exposure is employed.

Examples XXI–XXXII

A solution of resin and spiropyran in toluene is made according to the proportions given in Example I. This solution is then dip coated on aluminum and dried in a closed chamber at very high humidity to produce blushing on the surface of the dried coating. In Example XXXII, a solution of 2 grams of the spiropyran and 4 grams of the Staybelite Ester 10 resin are dissolved in 94 grams of acetone mixed with 2 grams of water and dipcoated on aluminum. As the coating dries, a blushing of the surface is also produced by the increasing water concentration left in solution as evaporation of the more volatile acetone proceeds. After the coatings of Example XXXI and XXXII are completely dried, they are imaged according to the procedure of Example I with essentially the same results.

Although specific materials and conditions are set forth in the above examples, these are merely illustrative of the present invention. Various other materials, such as any of the typical photochromic and/or resins listed above which are suitable, may be substituted for the materials listed in the examples with similar results. The films of this invention may also have other materials mixed, dispersed, copolymerized or otherwise added thereto to enhance, sensitize, synergize or otherwise modify the properties thereof. For example, sensitizers which accelerate the conversion of photochromic compounds from one photochromic state to the other and which are suitable for use herein may be employed. Many other modifications and/or additions to the process will readily occur to those skilled in the art upon reading this disclosure, and these are intended to be encompassed within the spirit of the invention.

What is claimed is:

1. A photographic method comprising providing an imaging layer containing a photochromic material, forming a uniform, fine, light scattering surface deformation pattern on said imaging layer, exposing said imaging layer to sufficient actinic electro-magnetic radiation energy in image configuration to convert at least a portion of said photochromic material from one photochromic state to another, and softening said imaging layer until said uniform, fine, light scattering surface deformation is smoothed out by surface tension in imagewise configuration to form an image.

2. A method according to claim 1 in which said photochromic material is initially in its lower, unexcited state including exposing said imaging layer with an electromagnetic radiation source of sufficient energy to convert exposed areas thereof to a higher excited photochromic state.

3. A method according to claim 1 in which said photochromic material is initially in its higher excited state including exposing said imaging layer with an electromagnetic radiation source of sufficient energy to convert exposed areas thereof to a lower unexcited photochromic state.

4. A method according to claim 1 further including the step of hardening said imaging layer after the formation of said image to fix it.

5. A method according to claim 4 including softening said imaging layer by applying heat thereto and then cooling said imaging layer to harden it.

6. A method according to claim 4 including softening said imaging layer by bringing it in contact with the vapor of a material which is at least a partial solvent therefor and then removing said imaging layer from contact with said vapor after the formation of said image.

7. A method according to claim 13 in which said imaging layer comprises up to about 99 percent by weight of a resin binder.

8. A photographic method comprising providing an imaging layer containing a photochromic 1,3,3-trimethyl-indolinobenzopyrylospiran material, forming a uniform, fine, light scattering surface deformation pattern on said imaging layer, exposing said imaging layer to sufficient actinic electromagnetic radiation energy in image configuration to convert at least a portion of said photochromic material from one photochromic state to another and softening said imaging layer until said deformation pattern is smoothed out by surface tension in imagewise configuration to form an image.

9. A method according to claim 8 in which said photochromic material comprises 6'-nitro-1,3,3-trimethylindolinobenzopyrylospiran.

10. A photographic method comprising providing an imaging layer comprising a solid solution of an insulating thermoplastic resin and an organic photochromic material, forming a uniform, fine, light scattering surface deformation pattern on said imaging layer, exposing said imaging layer to sufficient actinic electromagnetic radiation energy in image configuration to convert at least a portion of said photochromic material from one photochromic state to another and softening said imaging layer until said deformation pattern is smoothed out in imagewise configuration according to the difference in surface tension between exposed and unexposed areas.

11. A method according to claim 10 in which said imaging layer comprises from about 1 part by weight of photochromic material to about 8 parts by weight of resin to about 1 part by weight of photochromic material to about ½ part by weight of resin.

12. A method according to claim 10 in which said photochromic material comprises 6'-nitro-1,3,3-trimethyl-indolinobenzopyrylospiran.

References Cited

UNITED STATES PATENTS

| 3,108,872 | 10/1963 | McMahon | 96—49 XR |
| 3,149,120 | 9/1964 | Berman | 96—67 XR |

OTHER REFERENCES

Theoretical and Experimental Investigation of Photochromic Memory Techniques, December 1961, in Aeronautical Systems Division Report 61–70, p. 90.

NORMAN G. TORCHIN, *Primary Examiner.*

J. R. EVERETT, *Assistant Examiner.*

U.S. Cl. X.R.

96—48, 67, 90